Dec. 14, 1965 H. SHAPIRO 3,223,043
AXIAL AIR GAP MOTOR ADAPTED FOR CANNED PUMP
Filed Sept. 24, 1963 3 Sheets-Sheet 1
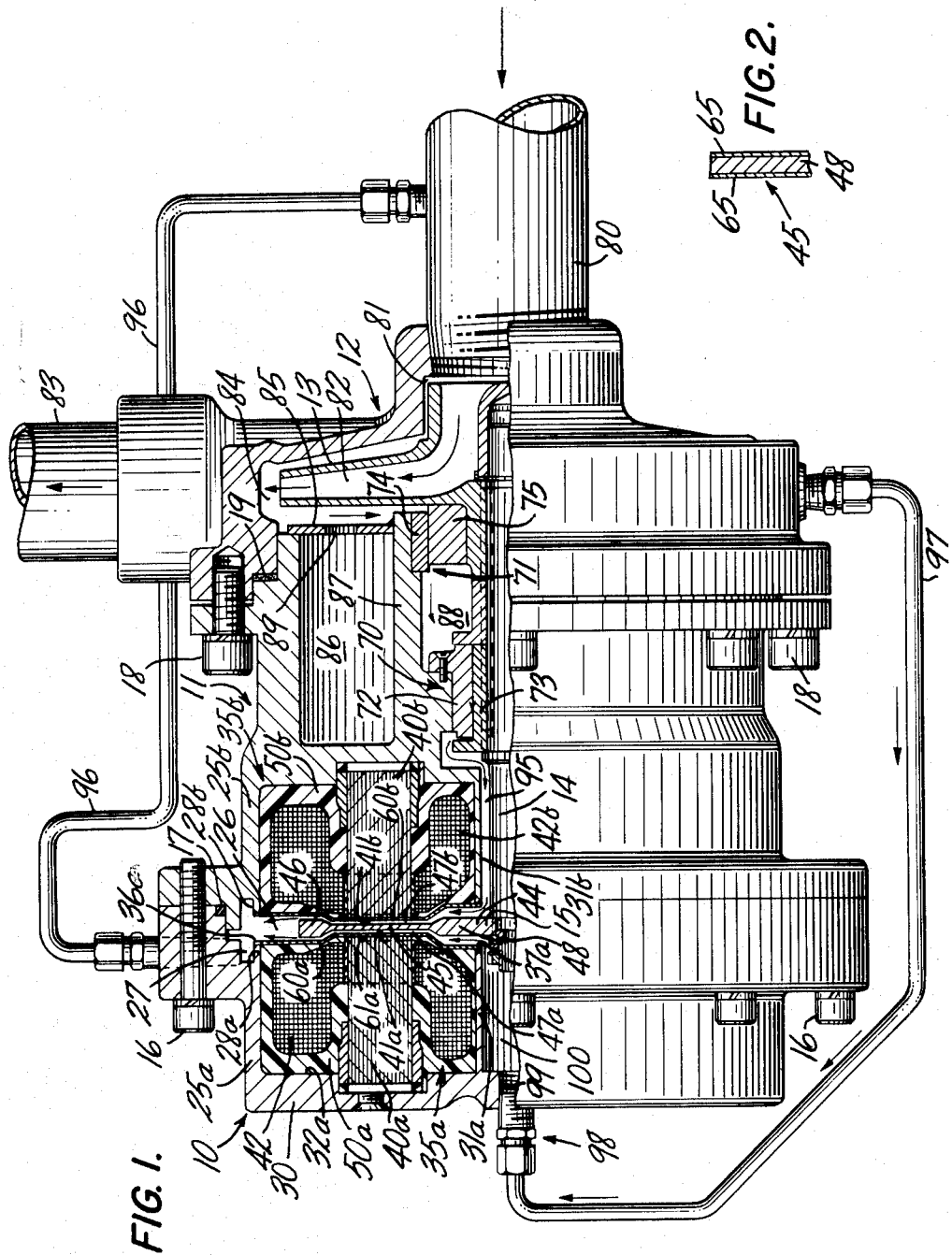
INVENTOR.
HARRIS SHAPIRO
BY Brumbaugh, Free,
Graves & Donohue
his ATTORNEYS Dec. 14, 1965     H. SHAPIRO     3,223,043
AXIAL AIR GAP MOTOR ADAPTED FOR CANNED PUMP
Filed Sept. 24, 1963     3 Sheets-Sheet 2
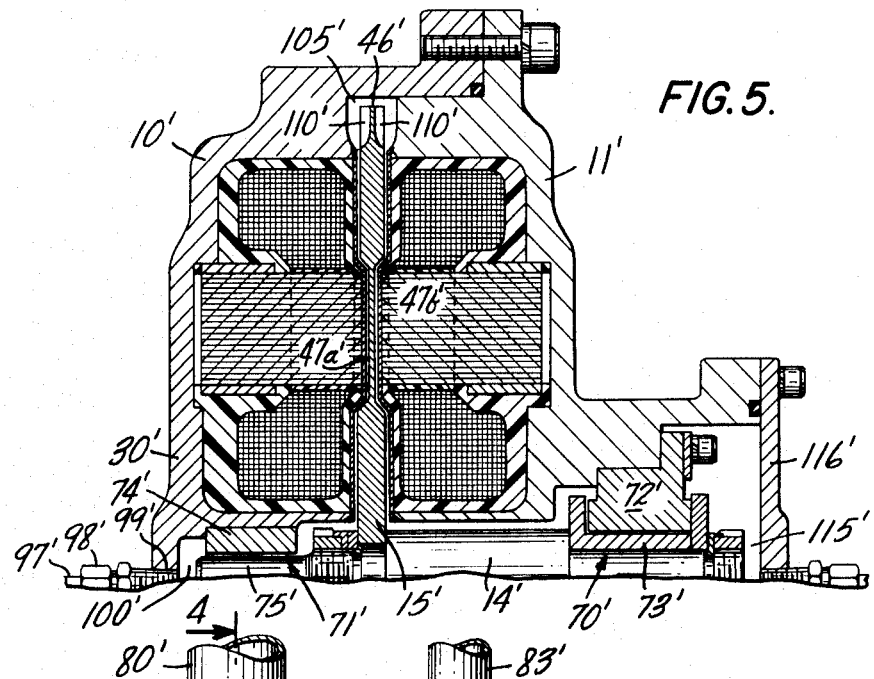
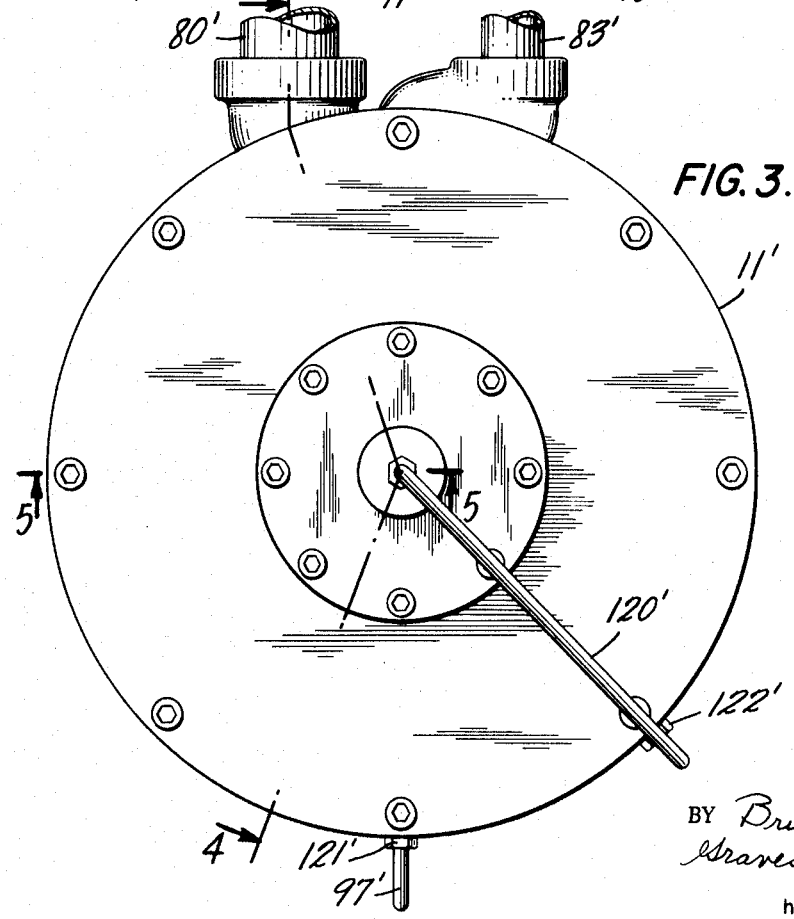
INVENTOR.
HARRIS SHAPIRO
BY Brumbaugh, Free, Graves & Donohue
his ATTORNEYS INVENTOR.
HARRIS SHAPIRO
his ATTORNEYS United States Patent Office 3,223,043
Patented Dec. 14, 1965

3,223,043
AXIAL AIR GAP MOTOR ADAPTED
FOR CANNED PUMP
Harris Shapiro, Englewood, N.J., assignor to General
Dynamics Corporation, New York, N.Y., a corporation of New York
Filed Sept. 24, 1963, Ser. No. 311,113
16 Claims. (Cl. 103—87)

This invention relates to axial air gap motors in general and, further, to improvements in the axial air gap motors disclosed in my copending original application Serial Number 143,614, filed October 9, 1961, and in my more recently filed application Serial Number 308,013 filed September 10, 1963 which is a continuation-in-part of said original application. More particularly, this invention relates to axial air gap motors adapted for use in canned pumps and to pumps incorporating such motors.

A canned pump is one in which seals are not used to prevent leakage of fluid in the pump from the pump section to the motor section. Thus, the electric motor of such a pump operates "wet" in that fluid is present in the rotor-stator interspace.

In the canned pumps of the prior art, the motors thereof have been of the conventional type wherein a hollow cylindrical stator surrounds a cylindrical rotor having a squirrel cage formed of electroconductive bars, the stator being separated from the rotor by a cylindrical clearance or gap. In order to prevent fluid in such gap from wetting or otherwise deteriorating a part or parts of the stator (such as the insulation on the stator winding), it has been necessary to protect the stator by enclosing it with a sheet metal "can." Such a can has a cylindrical wall which covers the inner stator face towards the gap so as to form a diaphragm which isolates that face from the fluid.

A disadvantage of such a can is that the mentioned cylindrical wall must be made by welding a piece of sheet metal back on itself, but to so weld two thin edges of sheet metal and, at the same time, obtain a satisfactory seam or joint is difficult to perform. Further, it is difficult, to fabricate the cylindrical wall to have such an exact size and shape that the wall everywhere will be flush against the inner face of the stator. Because of the mentioned considerations, the magnetic gap between stator and rotor must be substantially greater for a canned "wet" motor than a comparable "dry" motor, but such increase in gap size produces an undesirable increase in motor loss.

Moreover, because the squirrel cage bar rotor of the conventional canned pump motor is formed of two dissimilar metals (e.g., steel for the core and aluminum or copper for the bars of the squirrel cage), the rotor must also be protected by a positively sealed can having disadvantages substantially the same as those of the stator can.

It is, accordingly, an object of this invention to provide a "wet" motor which is free of the above-noted disadvantages.

Another object of this invention is to provide a "wet" motor of such sort which is particularly suitable for use in canned pumps.

Still another object of this invention is to provide canned pumps incorporating such a motor.

These and other objects are realized according to the invention by employing a motor of the axial air gap type as a "wet" motor, and by potting and/or canning the stator means of such motor to protect the stator means from the fluid which makes the motor "wet." Because an axial air gap motor has a radially extending gap rather than a cylindrical gap, all of the described difficulties in fabricating a cylindrical stator can may be eliminated. Also, because the rotor of an axial air gap motor may have a homogeneous outside surface, in many instances the can for the rotor may be eliminated entirely.

While the invention extends to single axial air gap motors having either one or two stators, preferably the motor is a polyphase induction motor of the double axial air gap type. What is meant herein by a double axial air gap polyphase induction motor is one in which there are two stators axially spaced by a radially annular gap, a rotor is disposed in such gap, and the two stators produce respective magnetic fields which rotate in a common direction around the gap, and which are in magnetic push-pull relation in that the two fields aid each other in producing magnetic flux in a path extending radially through both stators and axially through each of two radially opposite portions of the interstator gap so as to pass twice through that gap.

An axial air gap motor having protected stator means in accordance with the invention is of utility whether the fluid to which the motor is exposed is a gaseous fluid or is a liquid. Thus, for example, such a motor can be operated in an atmosphere of gas or vapor which would corrode or otherwise deteriorate the stator winding means of the motor if such winding means were unprotected. The discussed motor is, however, particularly suitable for use in a liquid atmosphere or in pumping a liquid because the liquid may be utilized to provide a highly effective cooling of the motor. Such cooling is accomplished by passing fluid in the radial direction through the axial, radially annular gap of the motor. Preferably, the direction of fluid flow is radially outward so as to permit the centrifugal action of the rotor to aid the flow.

The present invention extends both to "wet" axial air gap motors alone and to such motors when incorporated in the motor section of a canned pump. In accordance with one aspect of the invention, a "wet" axial air gap motor is employed as an integral components of a canned pump having impeller means which is driven by the motor to pump liquid in a main flow path, the motor being hydraulically connected to the main path in such manner that some of the liquid which is supplied to the pump is diverted to cool the motor by flowing through the gap thereof.

Other aspects of the invention will be later described in detail.

It is to be understood that the term "air gap" is used herein as descriptive of a gap between two elements whether such gap is filled with air, some other gaseous fluid or a liquid.

For a better understanding of the invention, reference is made to the following description of representative embodiments thereof and to the accompanying drawings wherein:

FIG. 1 is a side elevation, partly in cross section, of a centrifugal canned pump;

FIG. 2 is a view in cross section of a portion of the rotor of the FIG. 1 machine when that rotor is clad;

FIG. 3 is an end elevation of a canned turbo-pump according to the invention;

FIG. 5 is a view in cross section of the FIG. 3 pump, the cross sectional view being taken as indicated by the arrows 5—5 in FIG. 3.

Figure 4:
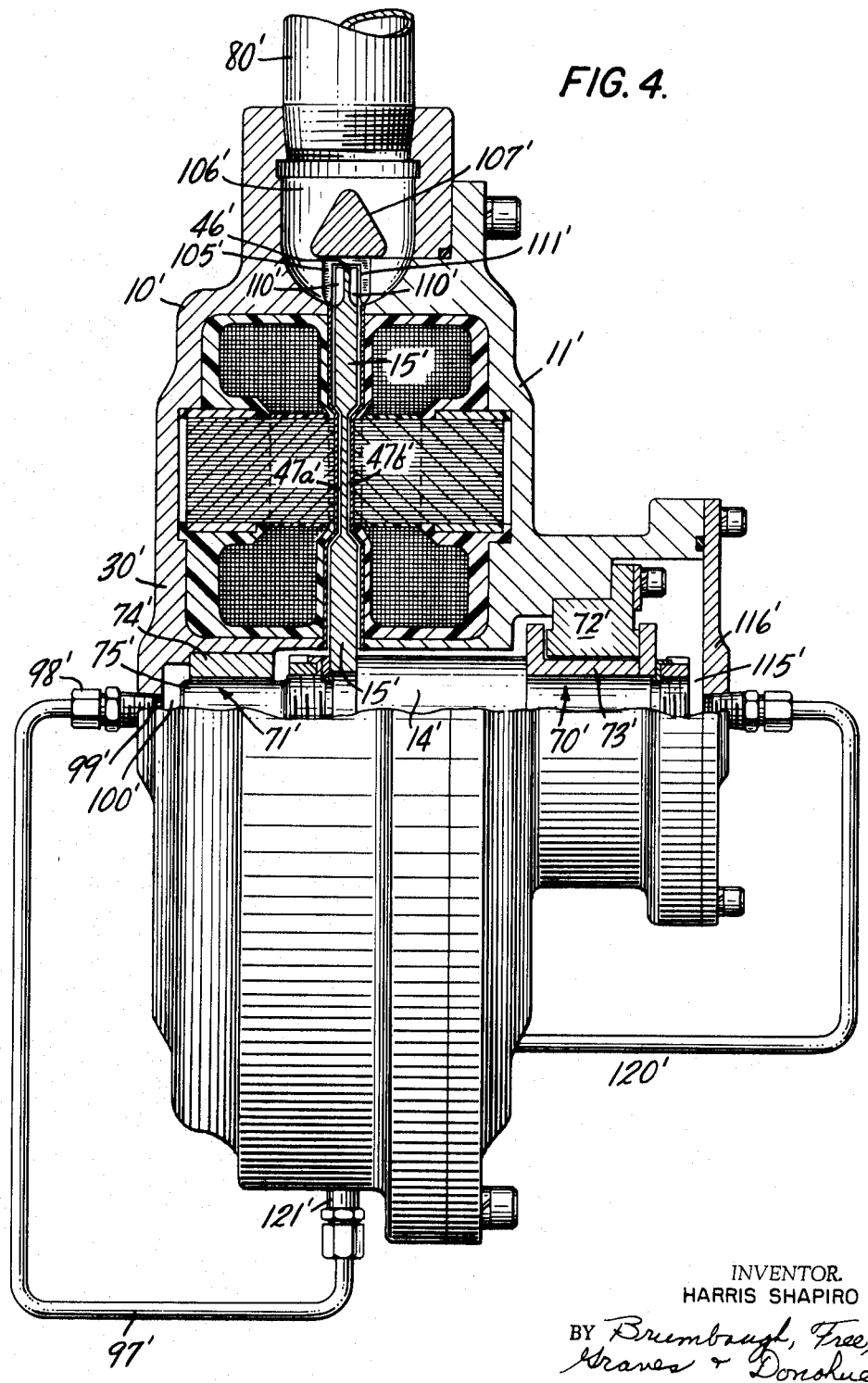
FIG. 4 is a side elevation of the FIG. 3 pump, part of FIG. 4 being in cross section as indicated by the arrows 4—4 in FIG. 3.

In the description which follows, counterpart elements will be designated by the same reference numerals but will be differentiated by different suffixes for those numerals, and is to be understood that (unless the context otherwise requires) a description hereinafter of one element is to be taken as equally applicable to all counterparts thereof.

Referring now to FIG. 1, the reference numerals 10, 11 and 12 designate, respectively, the left hand, middle and right hand housings for a canned pump having a centrifugal impeller 13 joined by a shaft 14 to the rotor 15 of a double axial air gap polyphase induction motor. The casings 10 and 11 are joined in equatorially mating relation by bolts 16 to provide for the motor a casing which is rendered liquid-tight by a gasket 17. The housings 11 and 12 are similarly joined in equatorially mating relation by bolts 18 to provide for the impeller 13 a casing which is rendered liquid-tight by the gasket 19.

Considering the motor section of the pump, the housing 10 and the left hand end of housing 11 are formed of matching cylindrical shells 25a and 25b coaxial with rotor 15 and axially spaced from each other by the radially outward portion of a gap 26 in which the rotor is disposed. Outwardly of gap 26, the shells 25a and 25b cooperate to form a collection groove 27 open towards gap 26 and of larger dimension than the gap so as to form respective stub flanges 28a and 28b at the front ends of the shells 25a and 25b, respectively.

The housing 10 is closed at its end away from gap 26 by a rear closure 30 providing a mounting for a sleeve 31a coaxial with shell 25a and projecting inside that shell towards the mentioned gap. The shell 25a, the inner wall surface 32a of rear closure 30 and the sleeve 31a together form within housing 10 an annular receptacle or cup 35a having an open end towards gap 26 and having outer and inner radially annular rim faces 36a and 37a provided by the front end faces of, respectively, the stub flange 28a and the sleeve 31a.

The cup 35a contains a stator comprised of an annular laminated stator core 40a secured at its rear end to housing 10 and formed of a helically wound coil of steel tape of high magnetic permeability. The core 40 at its end toward gap 26 has an annular planar front face 41a slotted by a plurality of equiangularly spaced radial slots (not shown) of which the openings are separated from each other by sector-shaped portions of the front face. Those slots contain inwardly of face 41a the active coil sides of a polyphase winding 42a which is energizable by current to produce a two-pole rotating magnetic field. That winding may be a polyphase winding which is conventional in radial air gap motors, as opposed to axial air gap motors, and which is of the sort shown in FIG. 4 of the mentioned original application. Alternatively, the polyphase winding may be of a type (disclosed in the mentioned continuation-in-part application) having a variable distribution among consecutive stator slots of the turns per slot of wire conducting current of a given phase, the distribution being of a character to suppress significant loss-producing M.M.F. space harmonics in the stator field.

The left hand end of housing 11 has an interior shape similar to that of housing 10 so as to provide an annular cup 35b in which is received a stator having a stator core 40b and a polyphase winding 42b alike to those of the left hand stator. The right hand stator generates a two-pole magnetic field which (looking from the motor towards impeller 13) rotates in the interstator gap in the same direction as the field from the left hand stator. The left hand and right hand fields are in push-pull magnetic relation in that the peak of fundamental north flux of one is in sufficient juxtaposition in the gap 26 with the peak of fundamental south flux of the other that the two fields aid each other in creating magnetic flux which is common to both stators, and which follows a path radially through both stators and axially across the interstator gap at each of the radially opposite sides thereof. That push-pull relation is realized when such north and south flux peaks are in exact juxtaposition. The described push-pull relation is, however, also realized when said two peaks of fundamental flux of opposing polarity have a slight angular misregistration for the purpose of reducing electrical losses as described in my copending application Serial Number 143,614.

The rotor of the motor has a hub 44 secured to the shaft 14, an annular web 45 in the interstator gap and a rim 46 radially outward of the stator cores. The web 45 is axially spaced from the stator means to its left and to its right by, respectively, the clearances 47a and 47b. As shown, the hub 44 and the rim 46 are each of greater axial thickness than web 45, each of elements 44 and 46 tapering in axial cross section to a joinder with the web.

In the FIG. 1 machine, the rotor is a one-piece element constituted entirely of a single, suitably machined bare disc 48 of homogeneous electroconductive material. Preferably, such disc is formed of non-magnetic electroconductive material such as hard drawn copper, chrome copper, brass, aluminum or the like, and, in that instance, the rotor is operably repelled from each stator. As described in my mentioned copending application Serial Number 143,614, such repulsion of the rotor gives rise to the advantage among others that the opposite repulsive forces tend to produce a stable dynamic positioning of the rotor midway between the two stators. Also, those repulsive forces oppose lateral deflection of the rotor rather than augmenting such deflection as attractive forces would do, and, consequently, the repelled rotor may be made thinner than an attracted rotor so as to have less mass and greater side clearances in an interstator gap of given size than would a comparable attracted rotor.

In some applications, however, it may be desirable for the rotor to be constructed of a single piece of magnetic material. The web portion of such a magnetic rotor will provide a low reluctance path between radially opposite sides of the interstator gap for flux of a value below that which saturates the web portion. Even so, in the described rotor the magnetic web portion is made sufficiently thin that it is saturated or near saturated circumferentially by the flow therethrough of only a small fraction of the total flux emanating from the stators, the remaining flux passing as before between the stators across the interstator gap. Thus, the motor remains a double axial air gap motor (with some loss of output due to flux leakage through the magnetic rotor) rather than being converted into a compound single axial air gap rotor.

The described motor is so dimensioned that the front face of each magnetic stator core is axially spaced from the near face of the electroconductive material of the rotor web 45 by a distance $S$ which renders the ratio of the width $g$ of the slot openings in the stator to the mentioned distance of a value within the range between and including the values 1.0 and 5.0. As taught in my mentioned continuation-in-part application, a value within such range for such ratio $S/g$ is adapted to provide a relatively low value of total electrical loss during motor operation.

In general, the presently disclosed motor as so far described is alike in construction (and possible variants in construction), operation and advantages to that disclosed in my copending application Serial Number 143,614.

Coming now to the features by which the described motor is adapted for "wet" operation, the left hand stator core 40a and its winding 42a are encapsulated in a void free fluid-impermeable electrically insulating mass of potting material 50a received in the annular cup 35a. Such potting material is preferably a synthetic resinous material adapted during manufacture of the motor to be molded by vacuum and/or pressure into the cup 35a and around the stator contained by that cup. The material 50a is cold-setting in the sense that when, once in place in the cup, it can be hardened by chemical action, irradiation or the like at a temperature which will not damage the insulation of the stator winding. Further, the material 50a is heat-resistant in the sense that it is not softened by the heat from the stator winding during the operation of the motor. While there are a number of such cold-setting heat-resistant synthetic resinous materials which are suitable for the purpose described, good results have been obtained when the potting material 50a is epoxy resin.

The potting material is so molded around the left hand stator that the material extends into and through the radial stator slots to form a protective deposit over the coil sides of winding 42a which are received in those slots inwardly of the stator front face 41a. Preferably, the potting material completely fills the slots so as to extend outward to the front face of the stator, the face itself being left bare of such material over the sector-shaped portions of the face which intervene the slots. Both radially inward and radially outward of the stator front face, the surface of the molded potting material has, as shown, a taper away from the gap so as to make room therein for the rotor hub 44 and rotor rim 46 which are axially wider than the rotor web 45.

As later described more fully, the motor is cooled by flowing liquid through the gap 26. When such liquid is non-injurious to both the magnetic material of the stator core 48 and to the potting material 50a, the encapsulation 50a by precluding wetting of the insulation of the stator winding is, of itself, sufficient to fully protect the left hand stator. In the event the cooling liquid would be injurious to the magnetic material of the stator core but not to the encapsulating material, suitable protection for the left hand stator may be obtained by covering the entire front face 41a of the stator core 40a with a thin layer of potting material.

There are, however, applications in which the cooling liquid would have an abrasive, corrosive or other deleterious action on the encapsulating material. For such applications, the left hand stator may be further protected by covering the open end of cup 35a with an annular diaphragm or "can" 60a which is impermeable to the liquid. Ordinarily, the diaphragm 60a is a thin annular sheet of metal which is preferably non-magnetic (e.g., stainless steel) so as not to short magnetic flux emanating from the teeth of the stator. For some applications, however, it may be preferably for the diaphragm to be formed, say, of a synthetic resinous material.

The diaphragm 60a is secured at its outer and inner margins to the outer and inner rim faces 36a and 37a of the cup 35a so as to provide a liquid-tight seal over the open end of that cup. Because the radial dimension of each of the rim faces 36a and 37a is substantially greater than the axial thickness of the diaphragm, minimum difficulty is encountered in joining the diaphragm margins to the rim faces by welding or the like.

Between its outer and inner margins, the diaphragm 60a is shaped to conform in contour to the front surface of the composite body formed by the left hand stator and the encapsulation around it. That is, the diaphragm is dished by, say, pressing to have a slightly salient annular planar loss 61a coextensive with the planar surface provided by the bare inter-slot sectors of the stator slots. 41a and the fillings of plotting material in the stator slots. Radially inwards and outwards of that boss, the diaphragm 60a inclines away from the gap 26 with a slope the same as that of the front face of the underlying potting material. Thus, because it has such configuration, the diaphragm 60a makes direct flat planar contact with the stator face 41a and, moreover, is backed everywhere within the cup 35a by the front face of the mentioned composite body. Inasmuch as the diaphragm 60a makes flat planar contact with the stator face and is so backed everywhere within the cup, the diaphragm may be made very thin (e.g., 5 mils) and does not take up much space in the gap between the stator face 41a and the rotor web 45.

Like the left hand stator, the right hand stator is protected against the liquid in gap 26 by potting material 50b in the cup 35b and, if necessary, by a diaphragm 60b. Since, as indicated, the mode of protection against liquid of both stators is the same, no detailed discussion on how the right hand stator is liquid protected is necessary.

The FIG. 1 rotor is, as stated, a bare disc 48 of homogeneous electroconductive material, the exterior surface of the disc being also the exterior surface of the rotor. In the instance, where, say, the disc 48 is copper and the liquid in gap 26 is a fluid which does not affect copper, the bare rotor disc 48 needs no protection and may be used as is. In instances where the liquid in the gap would be injurious to the unprotected disc, the exterior surface of the disc 48 may be protected by the cladding 65 which is shown in FIG. 2. The cladding may be applied by electroplating, dipping, metallizing, or any other suitable coating process. Depending on the contemplated application, the cladding material may be either metallic (e.g., stainless steel), or say, a synthetic resin. Magnetic cladding material may be employed inasmuch as the cladding 65 furnishes such a small percentage of the weight of the whole rotor as compared to disc 48 that the cladding material will not convert the rotor from one which is repelled from each stator to one that is attracted thereto.

It is to be noted that cladding of the rotor disc 48 is practical for the reason that the exterior surface of the disc is provided by a homogeneous metal (e.g., copper) rather than two dissimilar metals (e.g., and the steel core and aluminum bars of a conventional squirrel cage rotor). It is further to be noted, however, that, if demanded by the particular application, the disc 48 (like a conventional squirrel cage rotor) may be protected by enclosing the rotor with a positively sealed "can."

Among other advantages of the described motor which have not yet been mentioned (and which make it particularly suitable for canned pump applications), because the motor is of the double axial air gap type, the stator means of the motor has only two faces which are exposed to the liquid in the motor, and which must be made inert to the action of the liquid. Further, because the heat from the motor stator losses is distributed over two faces in contact with the liquid, and the heat from the rotor losses is also distributed over two side faces in contact with the liquid, a highly efficient transfer of heat takes place between the motor and the liquid passing therethrough. Still further, because, (as explained in my copending application Serial Number 143,614) the repulsive forces on the rotor eliminate any axial thrust therein from the stator fields, and, because, also, those repulsive forces permit the rotor to be made thin so as to have low weight, the motor can be mounted in any position with regard to the effect of the bearing thrust produced by the rotor.

As yet another advantage, a high slip canned or "wet" motor of the sort described can readily be excited by a variable voltage power supply to fulfill the need in, say, submarines for a low noise, fixed and variable speed pump. In such a motor, the high reactance stator (relative to the rotor) will filter many of the M.M.F. harmonics out of the air gap flux wave, and the solid conducting rotor will damp out the high order flux pulsations that do appear in the air gap flux wave. Moreover, the rotor slip heat that is generated at low speed will be easily conducted to the cooling liquid. The electrical harmonic noises which are normally present in induction machines due to rotor slotting cannot appear as the rotor has no slots. No noise due to air gap dissymmetrics can appear. Hence, the described "wet" motor is much more suitable to fill the mentioned need than are conventional "wet" motors.

It might also be pointed out that, because of (1) the ease with which the stators in the described motor can be protected, and (2) the fact that a rotor of, say, copper has good corrosion resistance to begin with and can be further protected readily in the manner previously described, the presently disclosed motor is well suited as a motor for a submersible pump.

The common shaft 14 for rotor 15 and impeller 13 is rotatably supported in the middle housing 11 by two axially spaced bearing assemblies 70 and 71 of which assembly 70 is formed by a bearing 72 in the housing 11 and a journal 73 on the shaft. The assembly 71 is likewise formed by a bearing 74 in the housing 11 and a journal 75 on the shaft. Since those two assemblies provide the only bearing support for the shaft 14, both the rotor end of the shaft and the impeller end thereof are free or cantilevered ends. The location of both bearing assemblies in the described middle housing makes the bearing alignment easy to maintain inasmuch as it is possible to machine both bearing bores in one manufacturing set up.

The rotor 15 through shaft 14 drives the centrifugal impeller 13 to pump liquid in a main path comprising (1) an axial inlet or suction pipe 80 leading to a chamber 81 in which the impeller rotates, (2) axial-radial passages 82 in the impeller itself, (3) a radial discharge or outlet pipe 83 leading off from the periphery of the chamber 81. As an incident to pumping, the impeller pressurizes the pumped liquid so that it has a higher pressure in the radially outward region 84 of the chamber 81 than it has in the region within suction pipe 80.

As shown, the impeller chamber 81 is separated by a partition 85 from an annular hollow space 86 isolated by a hollow cylindrical wall 87 from a space 88 around the shaft. The partition 85 has apertures 89 therein to permit pumped liquid to enter the space 86 for the purpose of aiding in the cooling of the right hand stator of the motor and of the bearings.

The motor section of the FIG. 1 machine is hydraulically connected to the pump section in a manner as follows.

As a first connection, liquid flows from the higher pressure region 84 in impeller chamber 81 to the lower pressure region in suction pipe 80 through the following branch path: radially inward in chamber 81 to the bearing assembly 71, axially leftward through assembly 71 in the interface between bearing 74 and journal 75, space 88, axially leftward through bearing assembly 70 in the interface between bearing 72 and journal 73, still axially leftward in the annular space 95 between the shaft 14 and the righthand inner sleeve 31b of the motor casing, radially outward in the motor gap 26 through clearance 47b between the rotor web 45 and the diaphragm 60b of the right hand stator, into the collection groove 27, and from said groove through piping 96 to the suction pipe 80. As a second connection, fluid flows from the higher pressure region 84 to the lower pressure region in pipe 80 via another branch path as follows: leftward in piping 97 (connecting region 84 to an axial fitting 94 threadedly received in a central aperture 99 in the enclosure wall 30 of lefthand motor housing 10), rightward through fitting 98 and aperture 99 into a hollow space 100 enclosed by the inner sleeve 31a of the housing 10, radially outward in the motor gap 26 through the clearance 47a between the diaphragm 60a of the left hand stator and the web portion 45 of the rotor, into collection groove 27, and, as before, through piping 96 back to the suction pipe 80.

Because of the described connections, the pressure differential between the high pressure region 84 and the low pressure region in pipe 80 causes some of the fluid supplied to the pump to flow radially outward in motor gap 26 and through each of the rotor-stator clearances 47a and 47b to provide effective cooling of both of the stators and of both sides of the rotor. Since the direction of flow of the liquid in those branch paths in the motor is radially outward, the centrifugal action on the liquid of the sides of the rotor aids the flow and helps to avoid clogging of the clearances. Inasmuch as the means which hydraulically connects the motor to the main flow path of the pump section includes the bearing means for the pump, the same liquid which cools the motor serves also to cool and to lubricate the bearings.

As an alternative mode of flowing the liquid through the bearings, a plurality of angularly spaced radial holes (not shown) may be formed in the wall 87, and a plurality of axial holes (not shown) may be formed to pass leftwardly from each impeller passage 82 through the impeller to a termination in the impeller chamber opposite the interface of the elements 74 and 75 of the bearing assembly 71. In the presence of such holes, relatively high pressure fluid will flow from space 86 to space 88 and then leftwardly, as before, through the bearing assembly 70, etc. Some of the fluid in space 88 will, however, flow rightwardly through bearing assembly 71 and then through the axial holes in the impeller to the radially inner portion of the impeller passageways 82.

In a FIG. 1 pump which has been built and operated successfully, the dimension of the pump was about 11½ inches along its axis between the left hand end of housing 10 and the right hand end of housing 12. The remaining dimensions of the pump were to the same scale in accordance with the showing of FIG. 1. Such pump had a total air gap of 0.94″ between the portions over the stator front faces of the respective diaphragms covering the left hand and right hand stators. The axial thickness of the rotor web was 0.050″, wherefore the clearance between each rotor face and the nearer diaphragm was 0.022″. In the constructed machine, 3 hp. was obtained from a motor with 20 pounds of active material whereas a conventional motor would contain about 45 pounds of active material for the same horsepower.

Referring now to the canned turbo pump shown in FIGS. 3–5, many of the features of that pump are similar to those already discussed in connection with the centrifugal impeller pump of FIG. 1. Hence, only the respects by which the turbo pump differs from the centrifugal pump will be described in detail.

In the turbo pump, the rim portion 46′ (FIGS. 4 and 5) of the rotor 15′ extends into a peripheral pumping groove 105′ formed by the cooperation of the left hand and right hand housings 10′ and 11′. The groove 105′ extends all the way around the motor section of the pump. Liquid is supplied to the groove by an inlet or suction pipe 80′ (FIGS. 3 and 4) opening at its bottom into a receiving chamber 106′ by which the groove 105′ is enlarged over a short length of its angular extent. The chamber 106′ contains a triangular deflector 107′ secured at opposite ends to angularly opposite walls of the chamber 106′. The deflector serves to direct incoming fluid to both sides of the rim portion 46′ of the rotor.

That rim portion has formed therein on both sides thereof a plurality of equiangularly spaced pockets 110′ which act as impeller elements. In operation, those impeller elements are rotated counter-clockwise (FIG. 3) by the rotor to pump liquid from chamber 106′ around a major arc of the groove 105′ to a discharge or outlet pipe 83′ (FIG. 3) separated from the pipe 80′ by a minor arc of the pumping groove. In the course of pumping the liquid around such major arc, the impeller elements 110′ progressively biuld up the pressure of the liquid by the well-known regenerative action characteristic of turbo pumps. Once the liquid has been pumped around groove 105′ to the discharge pipe 83′, the liquid is forced to exist through that discharge pipe by a constriction 111′ (FIG. 4) interposed in the groove 105′ between elements 80′ and 83′ and having a close fit with the rotor rim portion 46′ so as to strip the impeller elements 110′ of most of the liquid carried along thereby as those elements pass from the discharge side to the suction side of the constriction.

It is to be noted that the combined rotor-impeller of the FIG. 3 machine elminates the need for a separate impeller and the hydraulic loss associated with it. Thus, the FIG. 3 machine provides a more efficient wire to water unit than a machine with a separate impeller.

The rotor shaft 14′ is supported leftward of the rotor by a bearing means 71′ comprised of a bearing 74′ in the housing 10′ and a journal 75′ on the shaft. Rightward of the rotor, the shaft 14′ is supported by bearing means 70′ comprised of a bearing 72′ in the housing 11′ and a journal 73' on the shaft. At its left hand end, the shaft terminates in an end space 100' inside the rear closure wall 30' for housing 10'. At its right hand end, the shaft 14 terminates in an end space 115' formed inside housing 11', by a cover plate 116' bolted to the right hand end of the last named housing.

The motor is cooled by being hydraulically connected to the main flow path of the pumping section as follows: A pair of pipes 97' and 120' (FIG. 3) have their respective inlets 121' and 122' connected to separate regions within a portion of the major arc of groove 105' at which the pressure of the liquid is substantially greater than it is in chamber 106'. The liquid pressure at the inlet 122' is somewhat greater than it is at 121'. The pipes 97' and 120' carry liquid (FIG. 4) to, respectively, the space 100' and the space 115' at the left hand and right hand ends of the rotor shaft 14'. From the space 100', liquid flows in a left hand branch path through the interface of elements 74' and 75' of bearing assembly 71' and then through the roto-stator clearance 47a' to the pumping groove 105'. From the space 115', liquid flows in a right hand branch path through the interface of elements 72' and 73' of bearing assembly 70' and then through the rotor-stator clearance 47b' to the groove 105'. Although the pressure at the inlet 122' for the described right hand branch path through the motor is somewhat greater than the pressure at the inlet 121' for the left hand branch path, the respective volumetric rates of flow of liquid through the two branch paths is approximately the same because bearing assembly 70' (being a thrust bearing assembly) offers a greater resistance to liquid flow than does the bearing assembly 71. As is evident, the flow of liquid through the two mentioned branch paths serves: (1) to cool both stators of the motor and both sides of the rotor thereof, (2) to cool and lubricate each of the bearing assemblies 70' and 71'.

The above described embodiments being expemplary only, it will be understood that additions thereto, omissions therefrom and modifications thereof can be made without departing from the spirit of the invention, and that the invention hereof comprehends embodiments differing in form and/or detail from these which have been specifically disclosed. For example, an axial air gap "wet" motor of the sort described can be used in canned pumps of the axial flow type as well as in those of the centrifugal or turbo-pump type. Evidently, either the FIG. 2 clad rotor or a rotor with a positively sealed "can" may be used in the FIG. 3 machine as well as in the FIG. 1 machine. Accordingly, the invention is not to be considered as limited save as is consonant with the recitals of the following claims.

I claim:

1. A wet, double axial air gap polyphase induction motor comprising, a pair of stator means each having polyphase winding means and mutually spaced axially from each other by a radially annular gap, the separate winding means on said two stator means being each responsive to current energization to produce respective magnetic fields rotating in push-pull magnetic relation in a common direction around said gap, a rotor disposed in said gap, said rotor being responsive to said fields to undergo rotation and to be overall repelled from each stator means, and said rotor being in axially spaced relation from each of said stator means to provide for radial flow of liquid on opposite sides of said rotor in paths each disposed between and bounded by said rotor and one of said stator means, the surface portion of said rotor exposed to liquid in said paths being provided by rotor material of homogeneous composition, and means impermeable to said liquid and interposed between each of said paths and the winding means of the stator means bounding that path so as to protect such winding means from liquid in such path.

2. A motor as in claim 1 in which said rotor has thereon a cladding of corrosion-resistant material.

3. A motor as in claim 1 in which said means impermeable to liquid is diaphragm means for each stator means, each diaphragm means being constituted of nonmagnetic material.

4. A motor as in claim 1 in which said means impermeable to liquid is potting material encapsulating each polyphase winding means.

5. A motor as in claim 3 in which the front face of each stator means is a radially annular planar face having radial slots therein and sectors between said slots, and in which the diaphragm means associated with each stator means has a planar portion in direct flat contact with said sectors of the front face of that stator means.

6. An axial air gap polyphase induction motor comprising, casing means providing at least one interior cup having an open end disposed towards an axial radially annular gap, at least one annular stator having an annular front face with radial slots therein and a polyphase winding received in said slots, said stator being mounted in said cup with the front face of the stator towards said gap, an annular body of liquid-impermeable potting material received in said cup and occupying said slots to encapsulate said stator winding, the surface portions of said stator face between the slots therein being bare of said potting material and being exposed to said gap to bound the side of such gap, a rotor having an annular portion axially spaced from said stator by said gap, and means to provide for flow of liquid radially in said gap.

7. An axial air gap polyphase induction motor comprising, casing means providing at least one annular cup having an open end disposed towards an axial radially annular gap, at least one annular stator having an annular front face with radial slots therein and a polyphase winding received in said slots, said stator being mounted in said cup with the front face of the stator towards said gap, potting material received in said cup and encapsulating and filling said slots out to the surface portions between said slots of said stator face so as to encapsulate said stator and so as to form therewith a composite body providing a backing surface at the open end of said cup, a liquid impermeable diaphragm backed by such surface and in contact with said surface portions of said stator face and said potting material in said slots, said diaphragm covering the open end of said cup to be interposed between the front face of said stator and said gap, a rotor having an annular portion axially spaced from said stator by said gap, and means to provide for flow of fluid radially in said gap between said rotor portion and said diaphragm.

8. A double axial air gap polyphase induction motor comprising, casing means providing a pair of annular cups having confronting open ends on opposite sides of an axial radially annular gap, each cup at its open end having concentric radially-annular inner and outer rim faces, a pair of annular stators each mounted in a respective one of said cups and each having a radially annular planar front face, each stator having polyphase winding means received in radial slots in the stator front face, potting material received in each of said cups and encapsulating the stator therein to form with such stator a composite body providing a backing surface at the open end of the corresponding cup, said material being in the slots of such stator, a pair of annular nonmagnetic fluid-impermeable diaphragms each covering the open end of a respective one of said cups to be interposed between the stator in such cup and said gap, each such diaphragm having inner and outer margins secured to, respectively, the inner and outer rim faces of the corresponding cup, and having an axial thickness less than the radial dimension of either of such rim faces, and each such diaphragm having a planar portion in flat contact with the sectors of the front face of the stator in the corresponding cup, a rotor having an annular portion disposed in said gap, and means to provide for flow of fluid radially in said gap between said rotor portion and each diaphragm.

9. A canned pump comprising, an axial air gap polyphase induction motor having two liquid-protected stator means axially spaced by a radially annular gap, a rotor disposed in said gap to be axially spaced by respective radially annular clearances from said two stator means, impeller means disposed outside said gap in a main liquid flow path and rotated by said rotor to pump liquid through said main path, and mean hydraulically connecting radially inner and outer portions of each of said clearances to said main path to provide radial branch flow paths for said liquid through both of said clearances so as to produce a cooling of said two stator means and of both sides of said rotor by liquid flowing in said branch paths.

10. A canned pump as in claim 9 in which said impeller means develops a differential in the pressure of said liquid at different regions in said main path, and in which radially inner and outer portions of said clearances are respectively connected hydraulically to higher and lower pressure ones of said regions so as to produce by the pressure differential between such regions a flow of said liquid through said branch paths which is in the radially outward direction, and which is aided by the spinning of said rotor.

11. A canned peripheral turbine pump comprising, an axial air gap polyphase induction motor having two liquid-protected stator means axially spaced by a radially annular gap, casing means forming radially outwards of said gap a peripheral pumping groove open towards said gap so as to have a hydraulic connection with the radially outward portion thereof, said groove having inlet means and outlet means separated by a minor arc of said groove, a rotor having an annular portion disposed in said gap to be axially spaced by respective radially annular clearances from said two stator means, said rotor also having a rim portion received in said groove, impeller elements spaced in said groove around said rotor rim portion to be rotated when said rotor spins so as to pump liquid from said inlet means around a major arc of said groove to said outlet means, and hydraulic connections of the radially inner portion of each of said clearances to a major arc portion of said groove, said described hydraulic connections providing radial branch flow paths for said liquid through both of said clearances so as to produce a cooling of said two stator means and of both sides of said rotor liquid flowing in said branch paths.

12. A pump as in claim 11 in which said rotor is supported by separate bearing means disposed on opposite sides of said rotor, and in which each such bearing means forms a part of the hydraulic connection between said groove and the rotor-stator clearance nearest such bearing means.

13. A canned centrifugal impeller pump comprising, an axial air polyphase induction motor having two liquid-protected stator means axially spaced by a radially annular gap, a rotor disposed in said gap to be axially spaced by respective radially annular rotor-stator clearances from said two stator means, a centrifugal impeller disposed in coaxial, axially spaced relation from said rotor in a main liquid flow path, a shaft coupling said rotor and impeller and through which said rotor drives said impeller to pump liquid through said main path, bearing means for said shaft means, and means which includes said bearing means and which hydraulically connects radially inner and outer portions of each of said clearances to said main path to provide branch flow paths for said liquid through said bearing means and through both of said clearances so as to produce a cooling of said bearing means, said two stator means and both sides of said rotor by liquid flowing in said branch paths.

14. A pump as in claim 13 in which said bearing means is disposed between said rotor and impeller means and provides the sole bearing means for said shaft, said impeller divides said main path into low and high pressure sides, and said hydaulic connection means is comprised of a flow path connection from said high pressure side through said bearing means to the radially inward portion of the nearer rotor-stator clearance, a connection from said high pressure side to the rotor-stator clearance farthest from said bearing means, and a connection from the radially outward portion of said gap to said low pressure side.

15. A double axial air gap polyphase induction motor comprising, a pair of stator means axially spaced by a radially annular gap, rotor means having in said gap a substantially non-magnetic thin annular web which is structurally unitary in the radial and angular directions, and which is axially spaced by respective radially annular clearances from said two stator means, conduit means definitive of a path through said clearances for a flow of a liquid in contact with said rotor means and two stator means, a pair of polyphase winding means of which each is on a respective one of said stator means, said two polyphase winding means being responsive to current energization thereof to produce respective magnetic fields rotating in magnetic push-pull relation around said gap so as to rotate said web and to subject said web to equal and opposite repulsions from said two stator means, means coupled to said web and adapted to transmit the rotation thereof to liquid impeller means disposed outside said gap, and non-magnetic liquid-impermeable means interposed between each of said polyphase winding means and said path to protect such winding means from liquid in said path.

16. A canned pump comprising, a double axial air gap polyphase induction motor having two stator means each having polyphase winding means thereon and being axially spaced from each other by a radially annular gap, rotor means having in said gap a substantially non-magnetic thin annular web which is structurally unitary in the radial and angular directions and which is axially spaced by respective radially annular clearances from said two stator means, said two stator means being responsive to current energization of the winding means thereon to produce respective fields which rotate in magnetic push-pull relation around said gap, and which subject said rotor to equal and opposite repulsions away from said two stator means, impeller means disposed outside said gap in a main liquid flow path and driven by said rotor to pump a liquid through said main path, means definitive of branch paths through said clearances for flow of said liquid in contact with said rotor means and said two stator means, means by which radially inner and outer portions of said branch paths are connected to, respectively, a higher pressure region and a lower pressure region for said liquid in said main path so as to effect said flow of liquid in said branch paths in the radially outward direction through said clearances, and non-magnetic liquid-impermeable means forming part of each stator means and interposed between the polyphase winding means of that stator means and the adjacent clearance to protect such winding means from liquid in that clearance.

References Cited by the Examiner

UNITED STATES PATENTS

| | | | |
|---|---|---|---|
| 1,737,128 | 11/1929 | Ross | 310—166 |
| 2,550,571 | 4/1951 | Litman | 310—268 |
| 2,557,879 | 6/1951 | Lewis et al. | 103—87 |
| 2,573,283 | 10/1951 | Seitz | 310—268 X |
| 2,700,343 | 1/1955 | Pezzillo | 103—87 |
| 2,897,387 | 7/1959 | Walter | 310—268 |
| 3,041,976 | 7/1962 | Maynard | 103—87 |

FOREIGN PATENTS

| | | |
|---|---|---|
| 1,011,052 | 4/1952 | France. |
| 65,056 | 10/1891 | Germany. |

DONLEY J. STOCKING, *Primary Examiner.*

ROBERT M. WALKER, LAURENCE V. EFNER,
*Examiners.*